(12) United States Patent
Martiel et al.

(10) Patent No.: US 12,561,394 B2
(45) Date of Patent: Feb. 24, 2026

(54) METHOD FOR SYNTHESIZING A PRODUCT OF PAULI ROTATIONS

(71) Applicant: BULL SAS, Les Clayes sous Bois (FR)

(72) Inventors: Simon Martiel, Versailles (FR);
Timothée Goubault De Brugière,
Croissy S/Seine (FR)

(73) Assignee: BULL SAS, Les Clayes sous Bois (FR)

( * ) Notice: Subject to any disclaimer, the term of this patent is extended or adjusted under 35 U.S.C. 154(b) by 1081 days.

(21) Appl. No.: 17/573,720

(22) Filed: Jan. 12, 2022

(65) Prior Publication Data

US 2022/0222320 A1    Jul. 14, 2022

(30) Foreign Application Priority Data

Jan. 14, 2021    (EP) ..................................... 21151664

(51) Int. Cl.
 *G06F 17/16* (2006.01)
 *G06N 10/20* (2022.01)
 *G06N 10/40* (2022.01)
(52) U.S. Cl.
 CPC ............. *G06F 17/16* (2013.01); *G06N 10/20* (2022.01); *G06N 10/40* (2022.01)
(58) Field of Classification Search
 CPC ......... G06F 17/16; G06N 10/20; G06N 10/40
 See application file for complete search history.

(56) References Cited

U.S. PATENT DOCUMENTS

2020/0027017 A1* 1/2020 Shim ...................... G06N 10/40
2020/0311590 A1* 10/2020 Chen ...................... G06N 10/20

OTHER PUBLICATIONS

European Search Report for corresponding EP Application No. 21151664, dated Jun. 9, 2021.

(Continued)

*Primary Examiner* — Michael D. Yaary
(74) *Attorney, Agent, or Firm* — Meagher Emanuel Laks Goldberg & Liao, LLP

(57) ABSTRACT

A method for synthesizing a product of Pauli rotations, wherein said product of Pauli rotations comprises at least two different types of X, Y and/or Z n-qubits Pauli rotations and identities, where the method comprises:
 providing a table of p number of rows and m number of columns, where p is a number of qubits and m a number of rotations, each column describing one Pauli rotation and each row describing a qubit,
 the method performing iteratively, until the table is empty:
  a step of simulating conjugations of at least one pair of rows by simulating the insertion of a predetermined type of quantum gates on their respective qubit in order to bring one of the X, Y or Z entry of at least one column to an identity entry,
  for each simulation, a step of counting the number of identity entries that appeared,
  a step of associating a score to each simulation, where the higher score corresponds to the simulation bringing the most identity entries in the associated column, and
  a step of performing one conjugation, the conjugation having the higher associated score,
 a step of rewriting the table according to the result of the conjugation, by replacing the X, Y and/or Z entries of the column by an identity entry and by removing the columns containing only one X, Y or Z entry, the other entries of the columns being identity entries.

17 Claims, 8 Drawing Sheets

(56)           References Cited

OTHER PUBLICATIONS

Martiel et al., "Architecture aware compilation of quantum circuits via lazy synthesis", arxiv.org. Cornell University Library, 201 Olin Library Cornell University Ithaca. NY, 14853, Dec. 17, 2020 (Dec. 17, 2020), XP081840499.

Amy et al., "On the 1-14 CNOT-complexity of CNOT-PHASE circuits", arxiv.org. Cornell University Library, 201 Olin Library Cornell University Ithaca. NY, 14853, Dec. 5, 2017 (Dec. 5, 2017). XP081410908.

Meijer-Van De Griend et al., "Architecture-aware synthesis of phase polynomials for NISQ devices", arxiv.org. Cornell University Library, 201 Olin Library Cornell University Ithaca, NY, 14853, Apr. 13, 2020 (Apr. 13, 2020). XP081643345.

* cited by examiner

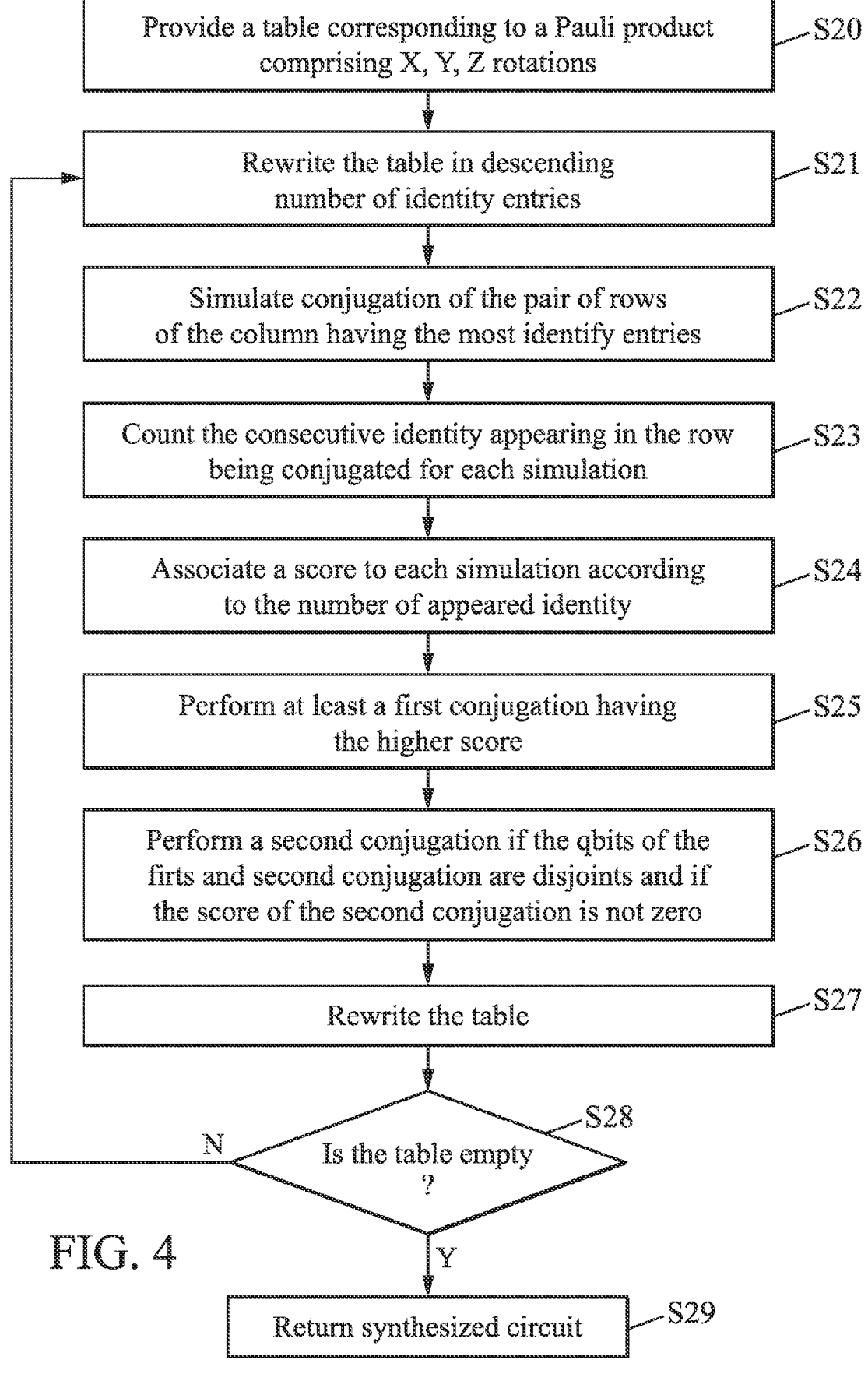

Provide a table corresponding to a Pauli product comprising X, Y, Z rotations — S20

Rewrite the table in descending number of identity entries — S21

Simulate conjugation of the pair of rows of the column having the most identify entries — S22

Count the consecutive identity appearing in the row being conjugated for each simulation — S23

Associate a score to each simulation according to the number of appeared identity — S24

Perform at least a first conjugation having the higher score — S25

Perform a second conjugation if the qbits of the firts and second conjugation are disjoints and if the score of the second conjugation is not zero — S26

Rewrite the table — S27

Is the table empty ? — S28

N

Y

Return synthesized circuit — S29

FIG. 4

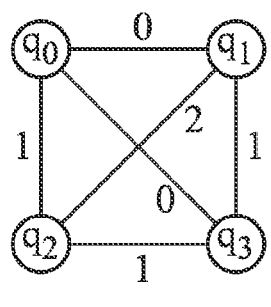
FIG. 5A
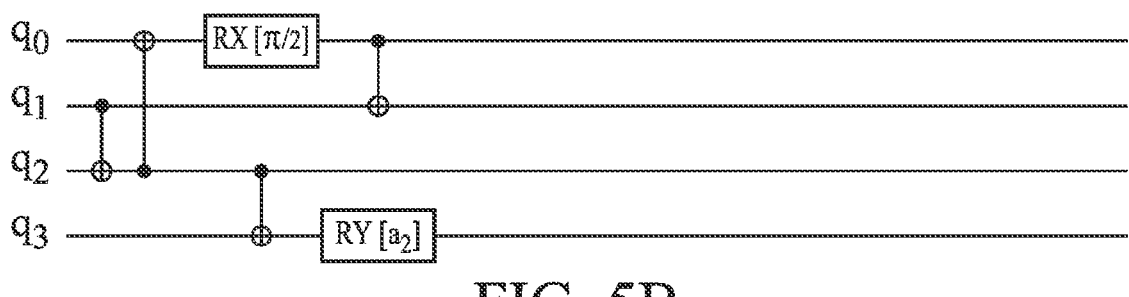
FIG. 5B
FIG. 5C

| IN | phase | OUT |
|----|-------|-----|
| II | 1 | II |
| IX | 1 | IX |
| IY | 1 | ZY |
| IZ | 1 | ZZ |
| XI | 1 | XX |
| XX | 1 | XI |
| XY | 1 | YZ |
| XZ | -1 | YY |
| YI | 1 | YX |
| YX | 1 | YI |
| YY | -1 | XZ |
| YZ | 1 | XY |
| ZI | 1 | ZI |
| ZX | 1 | ZX |
| ZY | 1 | IY |
| ZZ | 1 | IZ |

FIG. 6A

| IN | phase | OUT |
|----|-------|-----|
| I | 1 | I |
| X | 1 | Z |
| Y | -1 | Y |
| Z | 1 | X |

FIG. 6B

| IN | phase | OUT |
|----|-------|-----|
| I | 1 | I |
| X | 1 | X |
| Y | 1 | Z |
| Z | -1 | Y |

FIG. 6C

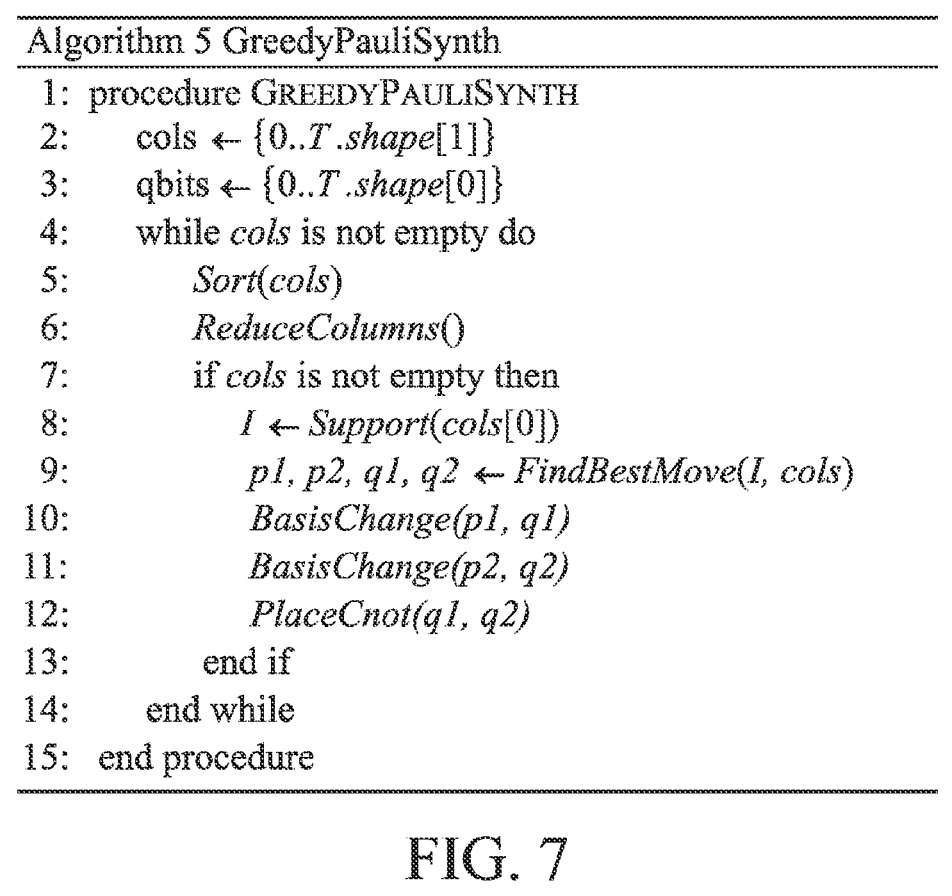

---
Algorithm 5 GreedyPauliSynth
---
1: procedure GREEDYPAULISYNTH
2:    cols $\leftarrow \{0..T.shape[1]\}$
3:    qbits $\leftarrow \{0..T.shape[0]\}$
4:    while *cols* is not empty do
5:        *Sort(cols)*
6:        *ReduceColumns()*
7:        if *cols* is not empty then
8:            $I \leftarrow Support(cols[0])$
9:            $p1, p2, q1, q2 \leftarrow FindBestMove(I, cols)$
10:          *BasisChange(p1, q1)*
11:          *BasisChange(p2, q2)*
12:          *PlaceCnot(q1, q2)*
13:        end if
14:    end while
15: end procedure
---

FIG. 7

Algorithm 6 GreedyPauliSynthDepth

```
 1: procedure GREEDYPAULISYNTHDEPTH
 2:     cols ← {0..T.shape[1]}
 3:     qbits ← {0..T.shape[0]}
 4:     while cols is not empty do
 5:         Sort(cols)
 6:         ReduceColumns()
 7:         I ← {0, ..., n - 1}
 8:         while I.len() > 1 do
 9:             p1, p2, q1, q2 ← FindBestMove(I, cols)
10:             BasisChange(p1, q1)
11:             BasisChange(p2, q2)
12:             PlaceCnot(q1, q2)
13:             I.remove(q1, q2)
14:         end while
15:     end while
16: end procedure
```

FIG. 8

METHOD FOR SYNTHESIZING A PRODUCT OF PAULI ROTATIONS

TECHNICAL FIELD

The disclosure concerns methods for synthesizing product of Pauli rotations in a quantum circuit.

BACKGROUND ART

From a first prior art "Quantum Science and Technology, Amy et al, together with Architecture-aware synthesis of phase polynomials for NISQ devices, Meijer et al", a method is known for synthesize quantum circuits for phase polynomials, for quantum circuits containing quantum rotation gates along Z axis. This method is also known as Graysynth algorithm. With this method, it is possible to obtain a compiled quantum circuit comprising a low number of CNOT gates. However, this method can be applied only to circuits comprising only the two above-mentioned quantum gates.

From a second prior art "A Generic Strategy for the Unitary Coupled Cluster Ansatz, Cowtan et al", a method is known to compile circuit by partitioning Pauli exponential terms into mutually commuting sets that are then diagonalized using Clifford circuits, to finally obtain compiled circuits while reducing depth and number of CNOT quantum gates. This method particularly performs basis changes to obtain only rotational quantum gates along Z-axis.

Although the results is a synthesized quantum circuit, this method requires an exponential number of steps and time to obtain these results, since it is needed, as a pre-processing step, to first modify the circuit to obtain only rotational quantum gates along Z-axis, which is complex and time consuming.

These known solutions make it possible to obtain a synthesized circuit, although a primary condition of having only rotational quantum gates along Z-axis is required. The invention at least partially remedies the shortcuts of the prior art and optimizes the synthesizing of quantum circuit comprising X, Y and Z Pauli rotations.

Therefore, according to this disclosure, it is provided a method for synthesizing a product of Pauli rotations. It will be advantageous to provide or obtain a table corresponding to the Pauli rotation which will show clearly the entanglement between the qubits as well as the rotations that apply to each qubit of the corresponding quantum circuit.

On this basis, the method will perform iteratively the conjugation of at least a pair of qubits by applying predetermined type of quantum gate between these qubits. It will be advantageous to simulate several, or all, possible conjugation between pair of qubits to determine which one will be the best. To determine which conjugation will provide the best result, a score can be applied to each simulation. The conjugation which will be effectively applied is the one with the best score.

In this way, the method according to the invention enables to be certain that, for each iteration, at least a part of the Pauli product is synthesized.

Moreover, the method according to the present disclosure leads to a synthesized quantum circuit with an optimized number of quantum gate, as well as a depth optimization.

SUMMARY

To this aim, there is provided a method for synthesizing a product of Pauli rotations, wherein said product of Pauli rotations comprises at least two different types of X, Y and/or Z n-qubits Pauli rotations and identities, said method comprising:

providing a table of p number of rows and m number of columns, where p is a number of qubits and m a number of rotations, each column describing one Pauli rotation and each row describing a qubit,
and wherein said method performs iteratively, until the table is empty:
a step of simulating conjugations of at least one pair of rows by simulating the insertion of a predetermined type of quantum gates on their respective qubit in order to bring at least one of the X, Y or Z entry of at least one column to an identity entry,
for each simulation, a step of counting the number of identity entries that appeared,
a step of associating a score to each simulation, wherein the higher score corresponds to the simulation bringing the most identity entries in the associated column, and
a step of performing at least one conjugation, said at least one conjugation having the higher associated score,
a step of rewriting the table according to the result of the conjugation, by replacing at least one X, Y and/or Z entry of the column by an identity entry and by removing the columns containing only one X, Y or Z entry, the other entries of the columns being identity entries.

The following features, can be optionally implemented, separately or in combination one with the others:

In an embodiment, at each iteration, the simulation step is preceded by a step of rewriting the table by sorting the columns in descending or ascending number of identities entry, such that a column at a first extremity of the table comprises the most identity entries and a column at a second extremity of the table comprises the less identity entries.

In an embodiment, at each iteration, the simulation step comprises the conjugations of the pair of rows of the column having the most identity entries, and for each simulation, counting the consecutive identity entries that appeared in the two rows being conjugated during the simulation step and associating said scores to each simulation, and performing the conjugation having the higher associated score.

In an embodiment, for each simulation, the consecutive identity entries are counted in the two rows, starting from the column having the most identity entries.

By performing the conjugation bringing the most identity entries, and focusing more precisely on the consecutive identity entries brought in the column having the most identity entries and the following consecutive columns, the method will converge quickly, thus optimizing the quantum gates count and the depth.

In an embodiment, the simulation step only simulates the conjugation of the pairs of rows having an X, Y and/or Z entry in the column having the most identity entries.

In an embodiment, at each iteration, the step of simulating comprises the conjugations of each pair of rows of the column having the most identity entries, and for each simulation, counting the consecutive identity entries that appeared in the whole row being conjugated, and performing at least one conjugation having the higher score associated.

In an embodiment, the performed one conjugation is a first conjugation of a first pair of rows, the step of performing at least one conjugation further comprises: performing a second conjugation of a second pair of rows if the qubits corresponding to each of the first and second pairs of rows are disjoints, and if the score associated with the simulation of the second conjugation is greater than 0.

In an embodiment, if several second conjugations are possible, performing the second conjugation having the higher associated score among all the possible second conjugations.

In an embodiment the step of simulating is followed by: providing a graph with p number of vertices and x number of edges, x being the number of pairs of row, each vertices corresponding to one qubit and each edge corresponding to a conjugation between a pair of qubit, the method further comprising: performing the counting step for each simulation and associating a score to each edge according to the associated simulation, performing a first conjugation corresponding to the edge having the higher associated score and performing a second conjugation if the edge corresponding to said second conjugation does not intersect the edge corresponding to the first conjugation and if the score associated to the second conjugation is greater than 0.

In an embodiment, these features are performed by calling a maximal matching algorithm, also known as the Blossom algorithm.

This embodiment allows further optimizing the depth and quantum gate count by performing two conjugations that bring the most identity entries.

In an embodiment, the method further comprises providing a rotation circuit representing the X, Y and/or Z n-qubits Pauli operators, at each conjugation step, inserting the predetermined type of quantum gates on the respective qubits in the rotation circuit, when withdrawing a column containing only one X, Y or Z entry, inserting a corresponding 1-qbit rotation gate on the respective qubit in the rotation circuit, when the table is empty, returning the synthesized rotation quantum circuit.

In an embodiment, the table is provided after: Providing a quantum circuit corresponding to the product of Pauli rotations, Rewriting the quantum circuit in the form of a table.

In an embodiment the predetermined type of quantum gates comprises Clifford quantum gates.

In an embodiment, the Clifford quantum gates preferably comprise :RX($\pi$/2) quantum rotation gates, and/or Hadamard quantum gates, and/or CNOT quantum gates.

In an embodiment, the product of Pauli rotations corresponds to a Hermitian simulation.

BRIEF DESCRIPTION OF DRAWINGS

Other features, details and advantages will be shown in the following detailed description and on the figures, on which:

FIG. 4 is a flowchart illustrating a variant of the method illustrated on FIG. 1.

FIGS. 5A to 5C illustrate a non-limitative application of the method illustrated on FIG. 4.

FIGS. 6A to 6C illustrate the tables for the conjugations and insertions of quantum gates that can be performed.

FIG. 7 is an example of the algorithm of the method illustrated on FIG. 2.

FIG. 8 is an example of the algorithm of the method illustrated on FIG. 4.

DESCRIPTION OF EMBODIMENTS

Figure 1:
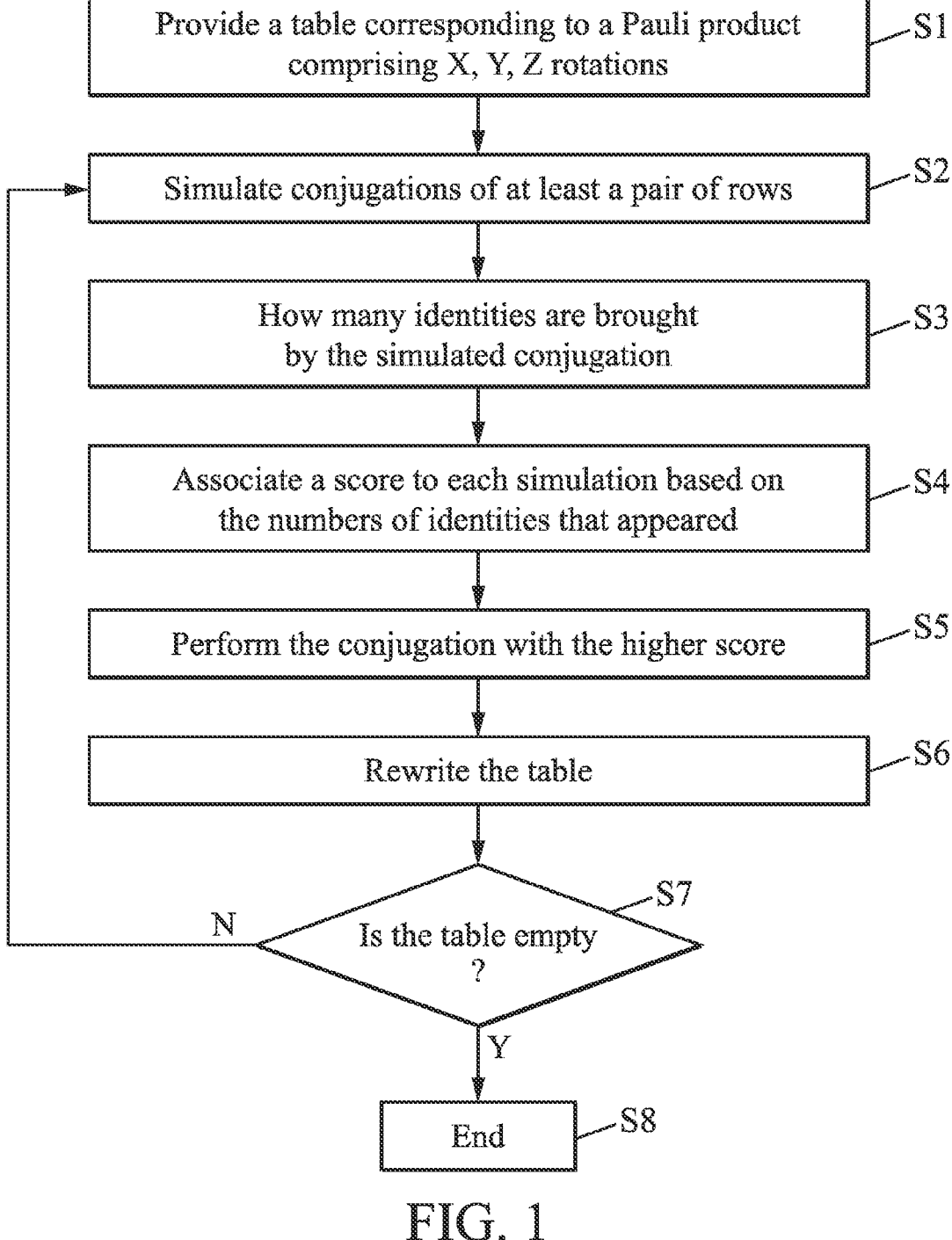
FIG. 1 is a flowchart illustrating steps of a method according to an embodiment.

FIG. 1 illustrates the step of a method of synthesizing a Pauli product according to an embodiment.

At step S1, a table corresponding to a Pauli product to be synthesized is provided.

For example, the Pauli product $$H=a_0Z_0Y_1X_3+a_1Y_0Z_2X_3+a_2Z_1Z_2Y_3+a_3X_0Z_1Y_2$$
$$Z_3+a_4X_0X_2Y_3$$

Can be represented by the table below $$\begin{pmatrix} Z & Y & X & X & I \\ Y & I & Z & I & Z \\ I & Z & Y & X & Z \\ X & X & Z & Y & Y \end{pmatrix}$$

Where the table comprises p rows and m columns, where p is the number of qubits and m the number of rotations, each column describing one Pauli rotation and each row describing a qubit.

In the table, the Is represent the identity entries, and the X, Y and Zs represent the corresponding X, Y and Z rotations.

In an embodiment, the table is obtained after a step of rewriting the Pauli product to be synthesized in the form of a table.

After being provided with the table, a step of simulation is made at step S2. The simulation step comprises the simulation of conjugations of at least one pair of rows of the table. The conjugation comprises the insertion of a predetermined type of quantum gates on the respective qubit of the pair of rows being for which the conjugation is simulated. The purpose of this conjugation is to bring at least one X, Y and/or Z entry of the table to an identity entry.

In an embodiment, the predetermined type of quantum gates comprises Clifford quantum gates. The Clifford quantum gates may comprise RX($\pi$/2) quantum rotation gates, Hadamard quantum gates and CNOT quantum gates.

For each simulation, the method will perform the simulation of the conjugation of a pair of rows by inserting predetermined quantum gates on the respective qubits. For example, the predetermined quantum gates may be RX($\pi$/2) quantum rotation gate and CNOT quantum gates, or Hadamard quantum gate and CNOT quantum gate.

In another example, only a CNOT quantum gate will be inserted.

FIGS. 6A to 6C show the tables for the conjugations and insertions of quantum gates that can be performed.

FIG. 6A illustrates the CNOT conjugation table. The table is read as follow: CNOT(IN)CNOT=phase.OUT.

FIG. 6B illustrated the Hadamard conjugation table.

FIG. 6C illustrates the conjugation table of the RX($\pi$/2) gate.

In an embodiment, the step of simulating conjugations is made for each pair of rows.

In an embodiment, the step of simulating conjugations is made for each pair of rows of each column.

At step S3, the number of identities entries that appeared for each simulation is counted, such that a score is associated with each simulation at step S4.

In an embodiment, this score is linked to the number of identities that appeared for each simulation. As an example, the score can be equal to the number of identities brought by each simulated conjugation. Then, if a simulated conjugation brings two X, Y, Z entries to two identity entries, the score will be equal to two.

This step is further described with reference to FIGS. 2 and 4.

In another embodiment, the score can be attributed on the basis of a scaled score.

At step S5, the method performs the conjugation corresponding to the simulated conjugation bringing the most identity entries, i.e. the simulated conjugation having the higher score associated.

At step S6, the table is rewritten according to the result of the conjugation.

In an embodiment, step S6 further comprises removing the columns containing only one X, Y or Z entry, the other entries being identity entries.

Then, it is determined at step S7 if the table is empty, i.e. if all the columns have been removed at step S6. When the table is empty, it means that all the qubits perform a 1-qubit rotation.

If not, the method performs again step S2 to S7 iteratively, until the table is empty.

When the table is empty, the method ends at step S8.

It can be seen that, since the method always perform the conjugation that brings the most identity entries, the method will eventually converge until all the qubits perform 1-qubit rotation.

Figure 2:
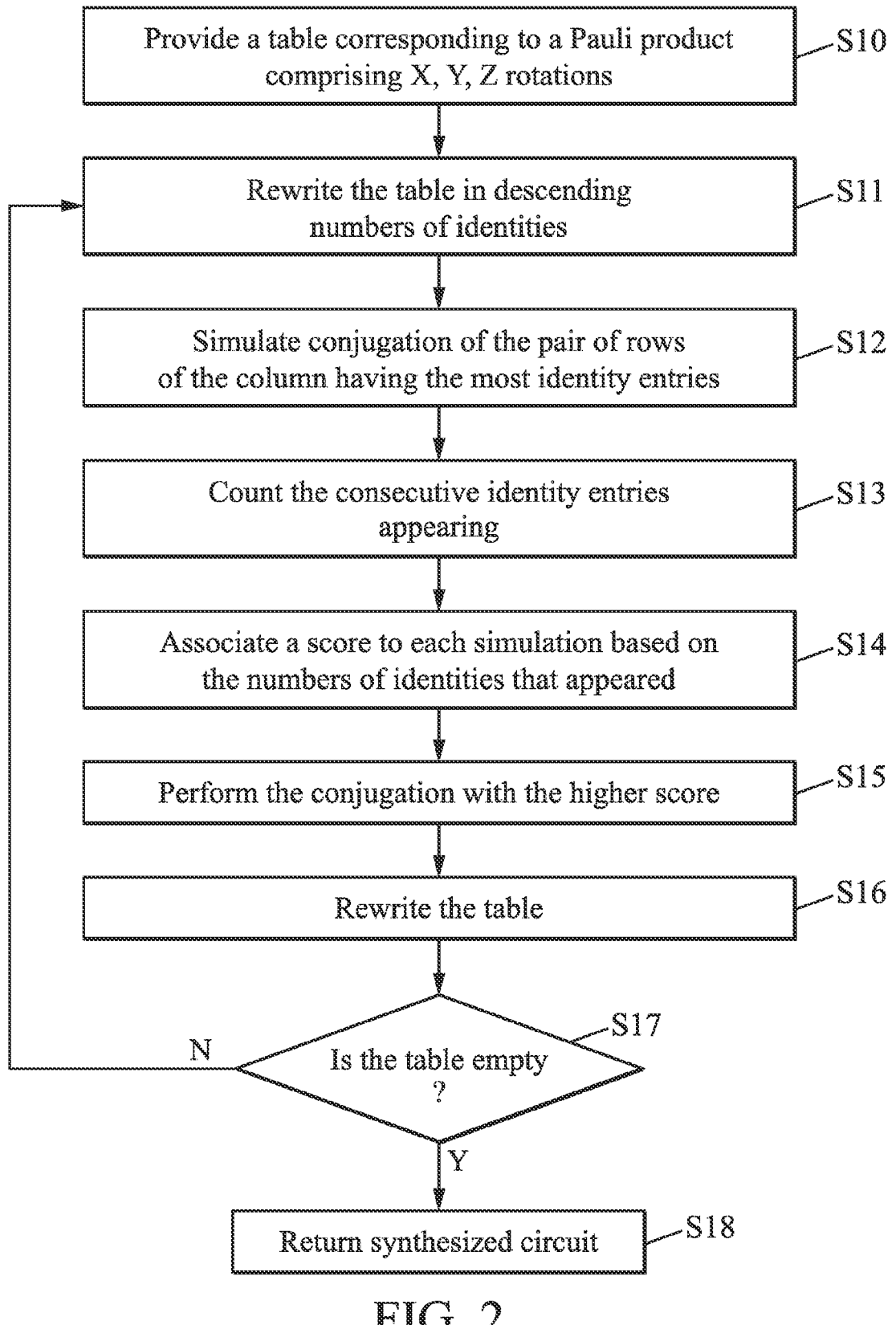
FIG. 2 is a flowchart illustrating a variant of the method illustrated on FIG. 1.

FIG. 2 illustrates the steps of a variant of the method according.

At step S10, the table is provided as described in step S1 of FIG. 1.

At step S11, the table is rewritten by descending numbers of identities in each column. Hence, the column at the extreme left is the column having the most identity entries while the extreme right column have the less identity entries.

In another embodiment, the table can be rewritten in ascending numbers of identities in each column. Hence, the column at the extreme right is the column having the most identity entries while the extreme left column have the less identity entries In the following description, reference is made to the embodiment where the columns are sorted in descending order from the left to the right.

Based on the exemplary Pauli product and the associated table described above, at step S11, the table would become:

$$\begin{pmatrix} I & X & Y & X & X \\ Z & I & I & Y & Z \\ Z & X & Z & I & Y \\ Y & Y & X & X & Z \end{pmatrix}$$

Then, at step S12, simulations of conjugations are performed. The simulation of conjugations is identical to the simulation described with reference to FIG. 1, step S2.

However, in this embodiment, the simulation step is applied on the pair of rows of the column having the most identity entries.

Then, in this example, the simulation step comprises the simulation of the conjugation of the pair of rows of the first column, being at the extreme left of the table.

In an embodiment, the simulation step is only applied on the pair of rows of the first column having a non-identity entry.

Then, according to the exemplary embodiment, the simulation step will comprise the simulation of the conjugations of rows 1 and 2 (row 0 being the identity entry), rows 1 and 3 and rows 2 and 3 of the first column.

In another embodiment, the simulation step comprises the simulation of the conjugation of the first pair of rows having a non-identity entry.

Step S12 can be preceded by a step of removing the columns comprising only one X, Y and/or Z rotation. Such columns are called trivial columns.

At step S13, the method performs the counting of the number of identities brought by each simulation and associates a corresponding score to each simulation at step S14.

More precisely, step S13 comprises the counting of the consecutive identities brought in the rows being conjugated during the simulation step.

Even more precisely, step S13 may comprise the counting of the consecutive identities brought in the rows being conjugated during the simulation step, starting from the first column.

At step S15, the simulated conjugation having the best score is effectively applied on the table.

In the illustrated example, it is found that the best conjugation is to insert a CNOT quantum gate between row 1 and 2. More precisely, this conjugation would bring two consecutive identity entries in the two first columns of the first half of the table.

Figures 3A, 3B, 3C, 3D, 3E:
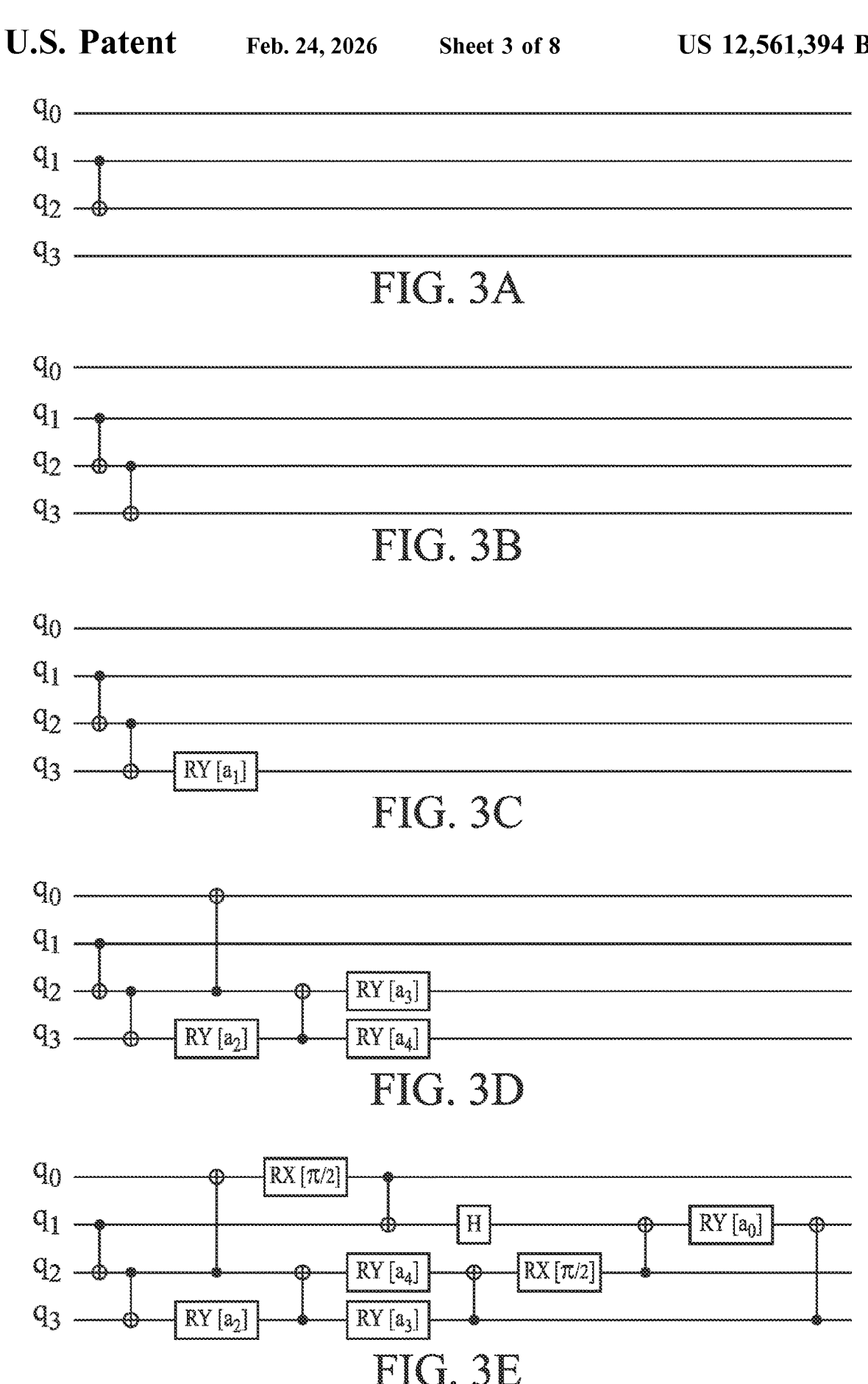
FIGS. 3A to 3E illustrate a non-limitative application of the method illustrated on FIG. 2.

FIG. 3A illustrates the rotation quantum circuit corresponding to the Pauli product and the corresponding table. It can be seen that a CNOT quantum gate is inserted between qubit 1 and 2. In FIGS. 3A to 3D, the qubits $q_0$ to $q_3$ correspond respectively to row 0 to row 3.

It is particularly advantageous to concentrate only on the columns having the most identity entries since each column must contain only one X, Y or Z rotation at the end of the method. However, if all the identity entries were counted, some columns with a large numbers of identity entries may comprise less identity entry at the end of the conjugation, increasing the execution time and the number of iterations until all columns contain only one X, Y or Z rotation, i.e. if all qubit perform 1-qubit rotation.

Once this conjugation is made at step S15, the table is rewritten. The table of the example then becomes:

$$\begin{pmatrix} I & X & Y & Z & X \\ I & I & Z & Y & I \\ Z & X & Z & X & Y \\ Y & Y & X & X & Z \end{pmatrix}$$

At step S17, it is determined if the table is empty, i.e. if all qubit perform 1-qubit rotation. If not, the method performs iteratively steps S12 to S17. If yes, the synthesized rotation quantum circuit is returned.

In the illustrative example, all qubit do not perform 1-qubit rotation since no column contains only one X, Y or Z rotation.

Then, at step S11, the table is rewritten in descending number of identities. The table becomes:

$$\begin{pmatrix} I & X & X & Y & Z \\ I & I & I & Z & Y \\ Z & X & Y & Z & X \\ Y & Y & Z & X & X \end{pmatrix}$$

Following the description of FIG. 2, step S12 to S14 are performed. More precisely, the simulation is made only for rows 2 and 3 of the first column, which contains the most identity entries, since rows 0 and 1 comprise each an identity entries.

The simulation step allows determining that the best conjugation, i.e. the conjugation with the higher score, is to insert a CNOT quantum gate from qubit 3 to qubit 2.

FIG. 3B shows the associated rotation quantum circuit, where the CNOT quantum gate has been inserted.

The table is then rewritten (step S16) and becomes:

$$\begin{pmatrix} I & X & X & Y & Z \\ I & I & I & Z & Y \\ I & Y & X & Z & X \\ Y & Z & Y & X & I \end{pmatrix}$$

It can be seen that the first column has become trivial since it only comprises one Y rotation. Then, the column may be removed from the table and the corresponding 1-qubit rotation gate can be inserted in the rotation quantum circuit, as illustrated on FIG. 3C.

Since all qubit do not perform only 1-qubit rotation, the method repeats iteratively steps S12 to S17.

The table at this stage is as follow:

$$\begin{pmatrix} I & X & Z & Y \\ I & I & Y & Z \\ Y & X & X & Z \\ Z & Y & I & X \end{pmatrix}$$

The simulation step shows that the best score is associated with the conjugation of qubit 2 to 0 by insertion of a CNOT gate such that the following table is obtained:

$$\begin{pmatrix} I & I & Y & Y \\ I & I & Y & Z \\ Y & X & Y & I \\ Z & Y & I & X \end{pmatrix}$$

Then, for the next iteration, the simulation step shows that the best score is associated with the conjugation of rows 2 to 3 by the insertion of a CNOT gate between qubit 2 and 3. This leads to the following table:

$$\begin{pmatrix} I & I & Y & Y \\ I & I & Y & Z \\ Y & I & Y & Y \\ I & Y & Z & X \end{pmatrix}$$

It can be seen that the two first columns become trivial since they only contain one Y entry. Then, the corresponding 1-qubit rotation fate are inserted in the associated rotation quantum circuit, as shown on FIG. 3D.

At the next iteration, the table becomes $$\begin{pmatrix} Y & Y \\ Y & Z \\ Y & Y \\ Z & X \end{pmatrix}$$

Since no row of the first column contains identity entries, at step S12, the simulation is made for all the rows of the first column.

In an embodiment, the simulation could be made for all rows of the two columns.

The next iterations are not shown, steps S12 to S17 being applied until all qubits perform 1-qubit rotation.

FIG. 3E shows the returned synthesized rotation quantum circuit, at the end of the method.

FIG. 7 shows the algorithm corresponding to the embodiment of FIG. 2.

FIG. 4 illustrates the step of another variant of the method.

At step S20, the table is provided as described in step S1 of FIG. 1.

At step S21, the table is rewritten by descending numbers of identities in each column, as described with reference to step S11 of FIG. 2.

In this example, the same Pauli product is used. The rewritten table is then:

$$\begin{pmatrix} I & X & Y & X & X \\ Z & I & I & Y & Z \\ Z & X & Z & I & Y \\ Y & Y & X & X & Z \end{pmatrix}$$

In step S22, the simulation step is performed. More precisely, the simulation step comprises the simulation of conjugation of the pair of rows of the column having the most identity entries (i.e. the first column in this example).

As described above, the simulation can be made only for the pair of rows having a non-identity entry of the first column.

At step S23, the method counts the number of identity entries that appeared for each simulation.

In this embodiment, the method may count the number of consecutive identity entries that appeared in the row being conjugated in the corresponding simulation.

At step S24, a score is associated to each simulation. The score may correspond to the number of consecutive identity entries that appeared in each simulation, the higher score corresponding to the simulation bringing the most consecutive identity entries in the associated row.

At step S25, the method effectively performs the conjugation for which the simulation has the higher score associated.

At step S26, a second conjugation can be performed. The second conjugation may be performed if the qubits that would be conjugated with the second conjugation are disjoint from the ones having been conjugated with the first conjugation. More precisely, the qubits of the first and second conjugation must be different from each other.

A second condition to perform the second conjugation is that the second conjugation should not have a score of zero associated. Hence, the second conjugation is made only if it brings at least one identity entry in the row corresponding to the qubit being conjugated.

During the first iteration, the method determines that a first conjugation to be applied at step S25 is the conjugation of qubits 1 and 2 which has the higher score associated.

It also determines that a second conjugation can be performed from qubit 0 to 3. However, since this conjugation has a score of zero associated, step S26 is not performed.

Following step S26, the following table is then obtained:

$$\begin{pmatrix} I & X & Y & Z & X \\ I & I & Z & Y & I \\ Z & X & Z & X & Y \\ Y & Y & X & X & Z \end{pmatrix}$$

Since all qubits do not perform 1-qubit rotation at step S27, i.e. the table is not empty, the method repeats step S22 to S28 iteratively.

The table is then rewritten in descending number of identity entries, to obtain the following table:

$$\begin{pmatrix} I & X & X & Y & Z \\ I & I & I & Z & Y \\ Z & X & Y & Z & X \\ Y & Y & Z & X & X \end{pmatrix}$$

During steps S22 to S26, the method will determine that one conjugation from qubit 2 to qubit 0, by inserting a CNOT, has the best score. Since there is no second conjugation having a non-zero score, the algorithm will only perform the first conjugation. It leads to the following table.

$$\begin{pmatrix} I & I & I & Y & Y \\ I & I & I & Z & Y \\ Z & X & Y & I & Y \\ Y & Y & Z & X & X \end{pmatrix}$$

It can be seen that the performed conjugation has a score of two since it brought two identity entries in the line being conjugated which is the first line, corresponding to qubit 0. Another identity entry also appeared on the third line of qubit 2 but this identity entry is not counted and does not change the score since it does not appear in the first line.

In the next iteration, the method determines that a first conjugation can be made from qubit 0 to qubit 1 with a score of 2 and a second conjugation from qubit 2 to qubit 3 with a score of 1.

The first conjugation from qubit 0 to qubit 1 comprises a basis change Y to Z and the conjugation from qubit 2 to qubit 3 comprises the insertion of a CNOT quantum gate.

The table becomes:

$$\begin{pmatrix} I & I & I & I & I \\ I & I & I & Z & Y \\ I & Y & X & I & Y \\ Y & Z & Y & X & I \end{pmatrix}$$

It appears that the first conjugation brings two identity entries in the first line corresponding to qubit zero, while the second conjugation brings one identity entry in the third line corresponding to qubit 2. The identity entry appearing in the last line corresponding to qubit 3 is not counted and does not change the score.

It can also be seen that the first column becomes trivial since it contains only one Y rotation. The corresponding 1-qubit rotation gate is inserted in the associated rotation quantum circuit and the first column can be removed from the table.

At this stage, the obtained rotation quantum circuit is illustrated in FIG. 5B.

During the next iteration, the method then determines that conjugation having the best score is to insert a CNOT quantum gate from qubit 3 to qubit 2 with a score of 1, producing the table below:

$$\begin{pmatrix} I & I & I & I \\ I & I & Z & Y \\ Y & I & X & Y \\ I & Y & X & Z \end{pmatrix}$$

No second conjugation is found. It can be seen that the performed conjugation also brings an identity entry in the last row of the first column. Even if this identity entry has not been counted when the score was associated to the conjugation from qubit 3 to qubit 2, it allows having two trivial columns which are the first and the second columns. These columns can thus be removed, which leads to the following table:

$$\begin{pmatrix} I & I \\ Z & Y \\ X & Y \\ X & Z \end{pmatrix}$$

Finally, the method will end the synthesizing of the Pauli product with three iterations comprising the insertion of a CNOT quantum gate from qubit 2 to qubit 1, then a basis change Y to Z on qubit 3 together with the insertion of a CNOT quantum gate from qubit 3 to qubit 2 and finally the insertion of a CNOT gate from qubit 1 to qubit 3.

At the end of the method, all the columns become trivial and the method return the synthesized rotation quantum circuit at step S29, which is illustrated on FIG. 5C.

The algorithm of the method described above is shown in FIG. 7. This variant of the method described with reference to FIG. 1 allows a greater parallelism in the CNOT application and a reduced depth by greedily picking the set of disjoint qubits.

In another embodiment, steps S23 to S26 are performed by calling a maximal matching algorithm, also known as the Blossom algorithm.

Regarding FIG. 7, the second while loop in line 8 would call the Blossom algorithm in the embodiment depicted on FIG. 4.

In this embodiment, the maximal matching algorithm looks for the best set of independent conjugations. By independent conjugation, it is understood a pair of disjoints qubits.

For each pair of qubit of the first column (i.e. the column having the most identity entries), the algorithm computes each pair of qubits, determines the best conjugation and its cost.

As it can be understood by looking at FIGS. 6A to 6C, there is 18 possibilities for each pair of qubits, based on the basis change in X, Y and Z (and X to X, Y to Y and Z to Z) for each CNOT gate orientation.

During the first iteration of the method of FIG. 4 described above, the algorithm provides the graph illustrated on FIG. 5A. The graph comprises p number of vertices, p being the number of qubits, and x number of edges, x being the number of pairs of qubits.

Then, in the illustrative example, the graph comprises four vertices and six edges.

As can be seen on the graph, each of the vertices is associated with a score.

To determine which conjugation would be the best, the algorithm calls a standard graph algorithm to extract a maximal matching being a set of edges that do not intersect and with a maximal weight.

In the illustrative example, the algorithm produces edges 1 and 2 having a score of 2 and edges 0 and 3 having a score of zero.

The first conjugation to be applied at step S25 is then the conjugation of qubits 1 and 2 having the maximal score. Since the second possible conjugation, from qubit 0 to 3, has a score of zero, step S26 is not performed.

What is claimed is:

1. A method for synthesizing a product of Pauli rotations into an optimized quantum circuit, where said product of Pauli rotations comprises at least two different types of X, Y and/or Z n-qubits Pauli rotations and identities, said method comprising:

providing a table of p number of rows and m number of columns, where p is a number of qubits and m a number of rotations, each column describing one Pauli rotation and each row describing a qubit; and performing iteratively, by a processor, until the table is empty:

simulating conjugations of at least one pair of rows by simulating the insertion of a predetermined type of quantum gates on their respective qubit in order to bring at least one of the X, Y or Z entry of at least one column to an identity entry;

for each simulation, counting the number of identity entries that appeared;

associating a score to each simulation, where the higher score corresponds to the simulation bringing the most identity entries in the associated column;

performing at least one conjugation, said at least one conjugation having the higher associated score; and rewriting the table according to the result of the conjugation, by replacing at least one X, Y and/or Z entry of the column by an identity entry and by removing the columns containing only one X, Y or Z entry, the other entries of the columns being identity entries, thereby progressively constructing the optimized quantum circuit comprised of quantum gates corresponding to the performed conjugations and 1-qbit rotation gates corresponding to the removed columns; and outputting the optimized quantum circuit.

2. The method according to claim 1, wherein, at each iteration, the simulation step is preceded by rewriting the table by sorting the columns in descending or ascending number of identities entry, such that a column at a first extremity of the table comprises the most identity entries and a column at a second extremity of the table comprises the less identity entries.

3. The method according to claim 2, wherein at each iteration:

the simulation step comprises the conjugations of the pair of rows of the column having the most identity entries;

for each simulation, counting the consecutive identity entries that appeared in the two rows being conjugated during the simulation step and associating said scores to each simulation; and performing the conjugation having the higher associated score.

4. The method according to claim 3, wherein for each simulation, the consecutive identity entries are counted in the two rows, starting from the column having the most identity entries.

5. The method according to claim 4, wherein the simulation step only simulates the conjugation of the pairs of rows having an X, Y and/or Z entry in the column having the most identity entries.

6. The method according to claim 3, wherein the simulation step only simulates the conjugation of the pairs of rows having an X, Y and/or Z entry in the column having the most identity entries.

7. The method according to claim 1, wherein at each iteration, the step of simulating comprises the conjugations of each pair of rows of the column having the most identity entries;

for each simulation, counting the consecutive identity entries that appeared in the whole row being conjugated; and performing at least one conjugation having the higher score associated.

8. The method according to claim 7, wherein the performed one conjugation is a first conjugation of a first pair of rows, the step of performing at least one conjugation further comprises:

performing a second conjugation of a second pair of rows if:

the qubits corresponding to each of the first and second pairs of rows are disjoints; and if the score associated with the simulation of the second conjugation is greater than 0.

9. The method according to claim 8, wherein the step of simulating is followed by providing a graph with p number of vertices and x number of edges, x being the number of pairs of rows, each vertices corresponding to one qubit and each edge corresponding to a conjugation between a pair of qubit; and the method further comprises:

performing the counting step for each simulation;

associating a score to each edge according to the associated simulation;

performing a first conjugation corresponding to the edge having the higher associated score; and performing a second conjugation if the edge corresponding to said second conjugation does not intersect the edge corresponding to the first conjugation and if the score associated to the second conjugation is greater than 0.

10. The method according to claim 8, wherein, if several second conjugations are possible, performing the second conjugation having the higher associated score among all the possible second conjugations.

11. The method according to claim 9, wherein the step of simulating is followed by providing a graph with p number of vertices and x number of edges, x being the number of pairs of rows, each vertices corresponding to one qubit and each edge corresponding to a conjugation between a pair of qubit; and the method further comprises:

performing the counting step for each simulation;

associating a score to each edge according to the associated simulation;

performing a first conjugation corresponding to the edge having the higher associated score; and performing a second conjugation if the edge corresponding to said second conjugation does not intersect the edge corresponding to the first conjugation and if the score associated to the second conjugation is greater than 0.

12. The method according to claim 7, wherein the step of simulating is followed by providing a graph with p number of vertices and x number of edges, x being the number of pairs of rows, each vertices corresponding to one qubit and each edge corresponding to a conjugation between a pair of qubit; and the method further comprises:

performing the counting step for each simulation;

associating a score to each edge according to the associated simulation;

performing a first conjugation corresponding to the edge having the higher associated score; and performing a second conjugation if the edge corresponding to said second conjugation does not intersect the edge corresponding to the first conjugation and if the score associated to the second conjugation is greater than 0.

13. The method according to claim 1, further comprising: providing a rotation circuit representing the X, Y and/or Z n-qubits Pauli operators;

at each conjugation step, inserting the predetermined type of quantum gates on the respective qubits in the rotation circuit;

inserting a corresponding 1-qbit rotation gate on the respective qubit in the rotation circuit when withdrawing a column containing only one X, Y or Z entry; and returning the synthesized rotation quantum circuit when the table is empty.

14. The method according to claim 1, wherein the table is provided after:

providing a quantum circuit corresponding to the product of Pauli rotations; and rewriting the quantum circuit in the form of a table.

15. The method according to claim 1, wherein the predetermined type of quantum gates comprises Clifford quantum gates.

16. The method according to claim 15, wherein the Clifford quantum gates comprise:

RX ($\pi/2$) quantum rotation gates; and/or

Hadamard quantum gates; and/or

CNOT quantum gates.

17. The method according to claim 1, wherein the product of Pauli rotations corresponds to a Hermitian simulation.

* * * * *